(12) United States Patent
Yamamoto

(10) Patent No.: US 11,763,124 B2
(45) Date of Patent: Sep. 19, 2023

(54) RFID TAG

(71) Applicant: KYOCERA Corporation, Kyoto (JP)

(72) Inventor: Shuichi Yamamoto, Kyoto (JP)

(73) Assignee: Kyocera Corporation, Kyoto (JP)

( * ) Notice: Subject to any disclaimer, the term of this patent is extended or adjusted under 35 U.S.C. 154(b) by 19 days.

(21) Appl. No.: 17/639,012

(22) PCT Filed: Aug. 12, 2020

(86) PCT No.: PCT/JP2020/030672
§ 371 (c)(1),
(2) Date: Feb. 28, 2022

(87) PCT Pub. No.: WO2021/039398
PCT Pub. Date: Mar. 4, 2021

(65) Prior Publication Data
US 2022/0405541 A1 Dec. 22, 2022

(30) Foreign Application Priority Data
Aug. 28, 2019 (JP) ................................. 2019-155303

(51) Int. Cl.
*G06K 19/077* (2006.01)
(52) U.S. Cl.
CPC ... *G06K 19/07756* (2013.01); *G06K 19/0772* (2013.01)

(58) Field of Classification Search
CPC ..................... G06K 19/0772; G06K 19/07756
USPC ........................................................... 235/492
See application file for complete search history.

(56) References Cited

U.S. PATENT DOCUMENTS

| 8,917,218 B2* | 12/2014 | Kato | ......................... H01Q 7/00 |
| | | | 343/788 |
| 2010/0309081 A1* | 12/2010 | Kobayashi | ............... H01Q 7/06 |
| | | | 343/788 |

FOREIGN PATENT DOCUMENTS

| JP | 11-168406 A | 6/1999 |
| WO | 2018/016624 A1 | 1/2018 |

* cited by examiner

*Primary Examiner* — Toan C Ly
(74) *Attorney, Agent, or Firm* — Volpe Koenig

(57) ABSTRACT

This RFID tag comprises: a film wiring substrate including a flexible base material having a first surface and a second surface located opposite to the first surface, and conductors located on the first and second surfaces, respectively; and an RFIC IC connected to the conductors, wherein the film wiring substrate is bent, and at least a first conductor part included in the conductor on the first surface, a second conductor part included in the conductor on the first surface or the second surface, and a conductor on the second surface that does not include the second conductor part overlap each other.

20 Claims, 13 Drawing Sheets

U.S. 11,763,124 B2

RFID TAG

TECHNICAL FIELD

The present disclosure relates to an RFID (radio frequency identifier) tag.

BACKGROUND

In a conventional RFID tag, an antenna conductor is formed on an insulating board of sintered ceramic, and an IC (integrated circuit) for RFID is mounted on the insulating board. According to an RFID tag described in WO 2018/016624A, an antenna conductor laminated on an insulating board realizes a compact tag with excellent wireless communication characteristics.

SUMMARY

An RFID tag according to the present disclosure includes:
a film wiring board that comprises:
    a base material which is flexible and which includes a first side and a second side opposite the first side; and
    conductors located on the first side and the second side; and
an RFID IC connected to the conductors,
wherein the film wiring board is folded so that at least a first conductor portion included in a conductor on the first side, a second conductor portion included in a conductor on the first side or the second side, and a conductor on the second side other than the second conductor portion overlap.

DETAILED DESCRIPTION

Embodiments of the present disclosure will be described in detail below with reference to the drawings.

Embodiment 1

Figure 1:
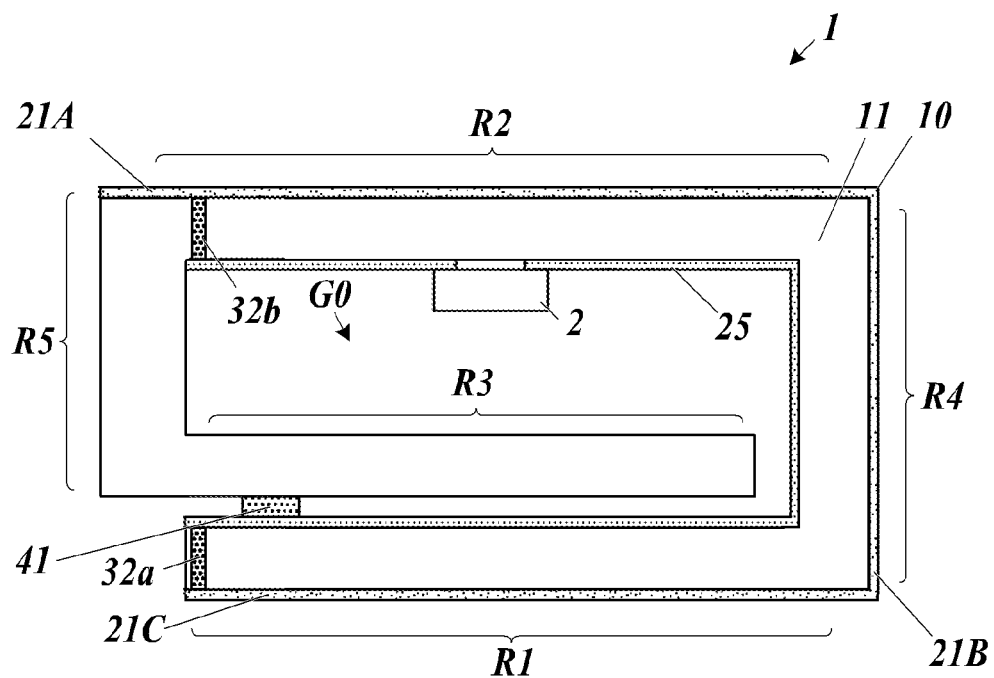
FIG. 1 is a schematic diagram of an RFID tag of Embodiment 1 of the present disclosure.
Figure 2:
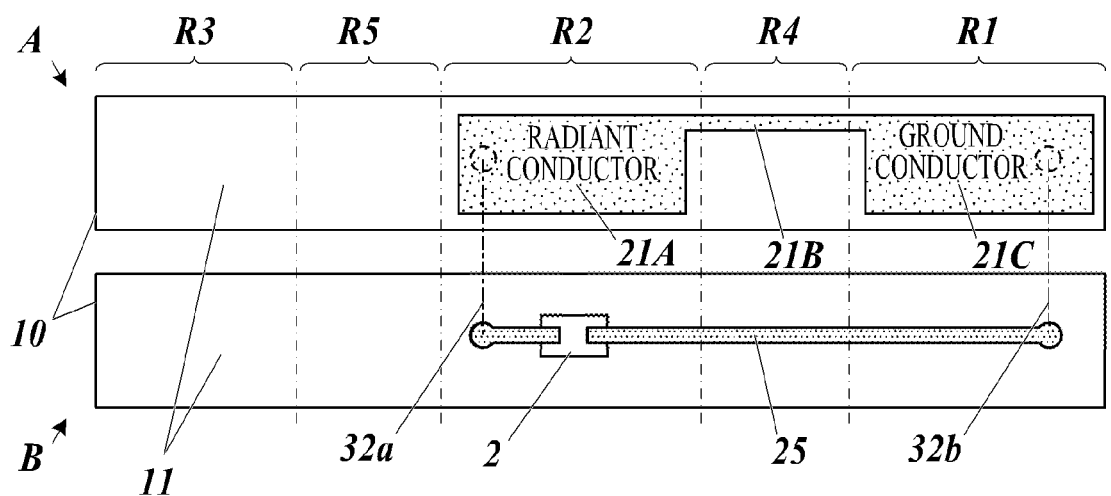
FIG. 2 is an illustration in which a film wiring board of the RFID tag in FIG. 1 is unfolded.

FIG. 1 is a schematic diagram of an RFID tag of Embodiment 1 of the present disclosure. FIG. 2 is an illustration in which a film wiring board of the RFID tag in FIG. 1 is unfolded.

Illustrations of film wiring boards being unfolded, from FIG. 2 onward, show:
a conductor pattern A on the front side when the film wiring board is viewed from the front side; and
a conductor pattern B on the back side seen through from the front side.

The RFID tag 1 of Embodiment 1 includes the film wiring board 10 and an RFID IC 2. The RFID IC2 communicates wirelessly with a reader/writer using, for example, UHF (ultra high frequency) band radio waves. The film wiring board 10 may be FPC (flexible printed circuits).

The film wiring board 10 includes:
a flexible and pliable film-like base material 11;
conductors (21A-21C, 25) laminated on the front and back sides of the base material 11; and
via conductors 32a, 32 b that connect between conductors on the front side and conductors on the back side through the base material 11.

The conductors (21A-21C, 25) of the base material 11 are conductor films fixed to the base material 11. The front side of each conductor may be covered with an insulating film. The material of the base material 11 is, for example, polyimide. The front and back sides of the base material 11 are examples of the first and second sides of the present disclosure.

Conductors on the front side include a radiant conductor 21A, a short-circuit conductor 21B, and a ground conductor 21C. The radiant conductor 21A, the short-circuit conductor 21B, and the ground conductor 21 C are lined up in this order in the longitudinal direction of the base material 11. Each of the radiant conductor 21A and the ground conductor 21C is wider than the short-circuit conductor 21B in the width direction of the base material 11 and has a larger area than the short-circuit conductor 21B. The radiant conductor 21A and the ground conductor 21C are advantageous in terms of miniaturization if they extend to the end of the base material 11 in the width direction. In that case, to prevent short circuit due to contact with an external conductive object, as in the example shown in FIG. 2, the radiant conductor 21A and the ground conductor 21C may extend to a position slightly inner than the end of the base material 11 in the width direction.

The conductor on the back side includes a wiring conductor 25 to which a signal terminal and a ground terminal of the RFID IC 2 are connected. The width of the wiring conductor 25 in the width direction of the base material 11 is narrower than the radiant conductor 21A and the ground conductor 21C. A part of the wiring conductor 25 is located behind the radiant conductor 21A and the ground conductor 21C. The RFID IC 2 is connected to the wiring conductor 25 via, for example, a conductive bonding material. A connection part of the RFID IC2 in the wiring conductor 25 is placed behind the radiant conductor 21A. Alternatively, it may be placed behind the ground conductor 21C.

The via conductor 32b connects the wiring conductor 25 with the ground conductor 21C. The wiring conductor 25 may be connected with the ground conductor 21C at a position farther from the RFID IC 2. The impedance of antenna can be increased by increasing the connection distance between the RFID IC 2 and the ground conductor 21C. It easily matches the output impedance of the RFID IC2 with the impedance of antenna. The RFID IC 2 may be placed in the center of the second region R2 in the longitudinal direction. The impedance can be further increased by positioning the RFID IC 2 away from the ground conductor 21C. If the wiring conductor 25 is made longer and the RFID IC 2 is mounted in a folding region R5 or the third region R3, the distance between the RFID IC 2 and the ground conductor 21 C (distance in the thickness direction of the RFID tag 1) becomes shorter. It decreases the impedance. Accordingly, the RFID IC 2 may be mounted at a position in the second region R2, the position being farthest from the first region R1 where the ground conductor 21C is located and being close to the folding region R5.

A wiring conductor 25 extending to the first region R1 from the connection portion of the RFID IC 2 may be extended to the third region R3. In that case, a via conductor and a connection pad connected to the via conductor may be provided on the front side of the third region R3. The via conductor is connected to the wiring conductor 25 on the back side of the third region R3 and penetrates to the front side. A connection pad may be provided on the back side of the first region R1, and a via conductor and a connection pad connected to the via conductor may be provided on the front side of the first region R1. The via conductor is connected to the connection pad provided on the back side of the first region R1 and penetrates to the front side. A conductive bonding material may connect the connection pad on the front side of the third region R3 with the connection pad in the first region R1. In the arrangement of the wiring conductor 25 according to Embodiment 1, there are few electrical connection points by the conductive bonding material. It improves reliability.

In Embodiment 1, the radiant conductor 21A on the front side is an example of the first conductor portion according to the present disclosure. The ground conductor 21C on the front side is an example of the "second conductor portion included in the conductor on the first side" according to the present disclosure. The wiring conductor 25 on the back side is an example of the "conductor on the second side other than the second conductor portion" according to the present disclosure.

The via conductor 32a connects one end of the wiring conductor 25 to the radiant conductor 21A. The via conductor 32b connects the other end of the wiring conductor 25 to the ground conductor 21C. The via conductor 32a may be disposed on the side of the radiant conductor 21A which is farther from the short-circuit conductor 21B than the center. The via conductor 32b may be disposed on the side of the ground conductor 21C which is farther from the short-circuit conductor 21B than the center.

As shown in FIGS. 1 and 2, folding regions R4, R 5 of the film wiring board 10 are folded. The first region R1 having the ground conductor 21C, the second region R2 having the radiating conductor 21 A, and the third region R3 overlap. Portions of the first region R1 and the third region R3 are joined together with a bonding material 41 to keep the fold. As the folding regions R4 and R5, a region where the short-circuit conductor 21B and the wiring conductor 25 are disposed and a region where no conductor is disposed are employed.

In a state where the film wiring board 10 is folded, the radiant conductor 21A and the ground conductor 21 C face outward and are located on the outside of the RFID tag 1. The wiring conductor 25 and the RFID IC 2 face inward and are located inside the RFID tag 1. A space G0 which is higher than the RFID IC 2 may be provided inside the film wiring board 10 which is folded and wound.

In the RFID tag 1 configured as described above, the radiant conductor 21A, which is the first conductor portion, and the ground conductor 21C, which is the second conductor portion, overlap facing opposite sides. Edges of the radiant conductor 21A and the ground conductor 21C are connected to each other via the short-circuit conductor 21B. The signal terminal of the RFID IC 2 is connected to a portion of the radiant conductor 21A via the wiring conductor 25 and the via conductor 32b, the portion being far from the short-circuit conductor 21B. The contact point between the radiant conductor 21A and the via conductor 32b is a power feed point. The radiant conductor 21A, the short-circuit conductor 21B, and the ground conductor 21C constitute a plate-shaped inverted F antenna. Such a configuration achieves miniaturization of the RFID tag 1 and good antenna characteristics of the RFID tag 1.

According to the above configuration, the RFID IC 2 is placed inside the folded film wiring board 10. Therefore, the RFID IC 2 is protected by the flexible film wiring board 10. It improves durability of the RFID tag 1. The RFID IC 2 does not protrude outward from the film wiring board 10. It achieves miniaturization.

In the examples shown in FIGS. 1 and 2, the third region R3 extends to a position where it overlaps the radiant conductor 21A and the ground conductor 21C and is bonded to the first region R1. The third region R3 extends further from the bonded position toward the short-circuit conductor 21B. The fold can be kept without connection of the third region R3 between the radiant conductor 21A and the ground conductor 21C, i.e., without the portion of the third region R3 beyond the bonded portion (where the bonding material 41 is located). On the other hand, in a case where the third region R3 is arranged to extend to the space between the radiant conductor 21A and the ground conductor 21C, the same effect is achieved as in a case where spacers 42, 42a, 42b constituted by dielectrics are provided, as described in Modifications 1 and 2 below. Since the base material 11 which is a dielectric is located between the radiant conductor 21A and the ground conductor 21C, antenna gain is improved and miniaturization is achieved.

Modifications 1 and 2

Figure 3:
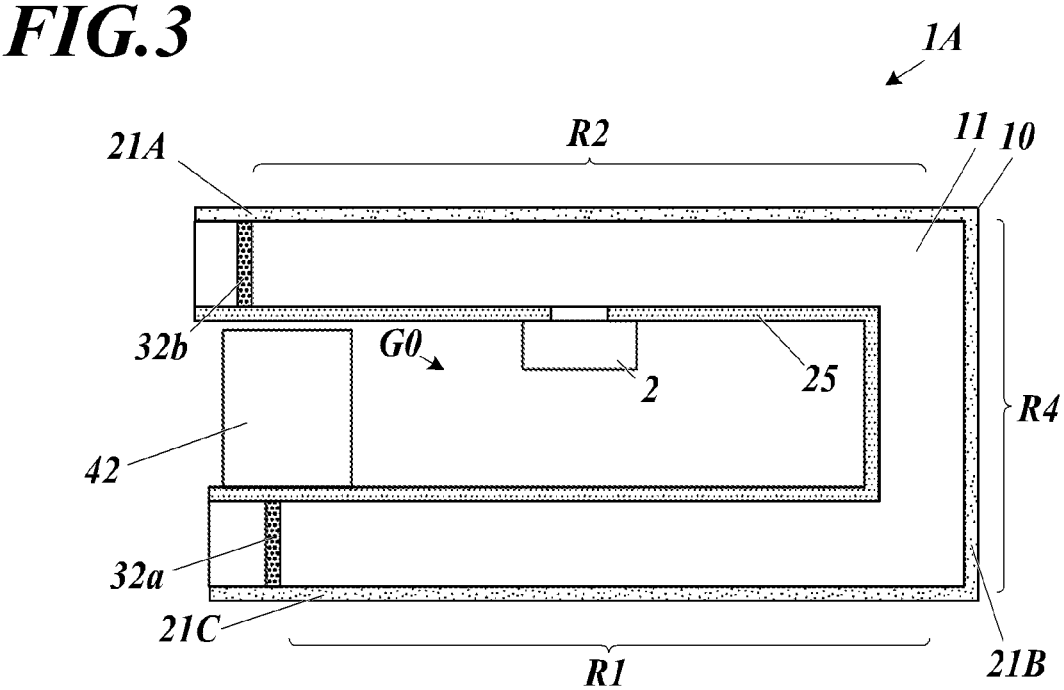
FIG. 3 is a schematic diagram of an RFID tag of Modification 1.
Figure 4:
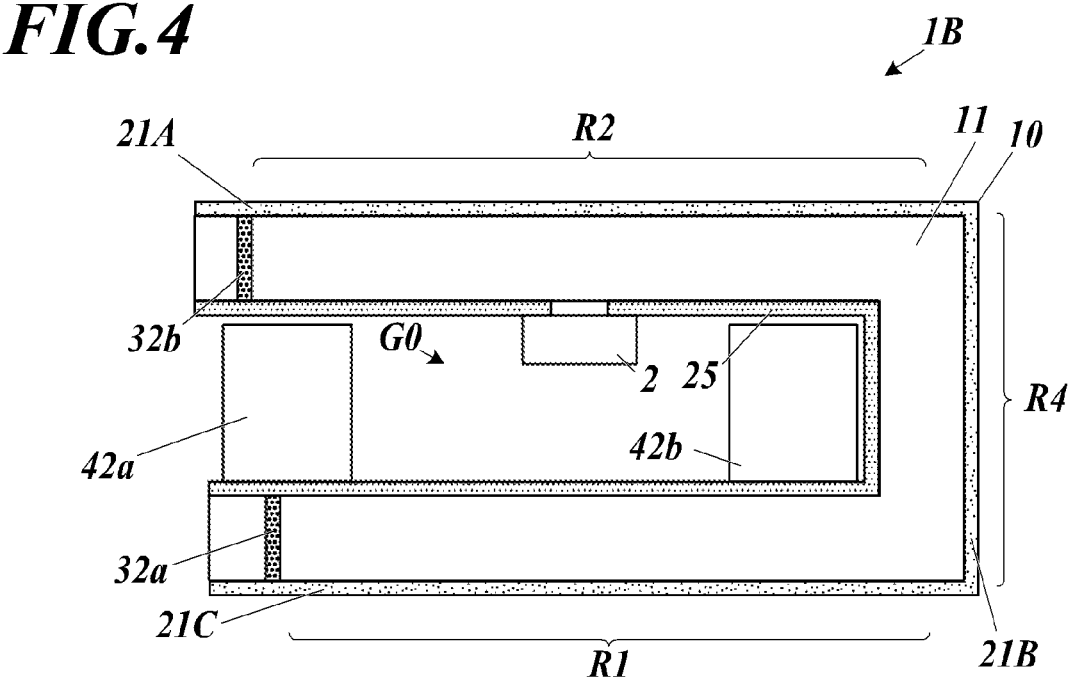
FIG. 4 is a schematic diagram of an RFID tag of Modification 2.

FIG. 3 is a schematic diagram of an RFID tag of Modification 1. FIG. 4 is a schematic diagram of an RFID tag of Modification 2. The RFID tags 1A, 1B of Modification 1 and Modification 2 have one spacer 42 or spacers 42a, 42b inside the folded portion of the film wiring board 10.

The one spacer 42 or the spacers 42a, 42b do not fill the entire inner space G0, which is made by folding. Specifically, the one spacer 42 or the spacers 42a, 42b do not fill a partial range of the space G0 in the longitudinal direction (longitudinal direction of the base material 11 on the radiant conductor 21A). They are arranged so as to leave a gap in one part in the longitudinal direction. The spacers 42, 42a, 42b may be flexible.

According to such a configuration, the spacers 42, 42a, 42b keep the height of the space G0 (height in the direction perpendicular to the radiant conductor 21A). In a case where the RFID tags 1A, 1B are attached to a curved surface having a curvature in the longitudinal direction of the space G0, the RFID tags 1A, 1B can be flexibly deformed along the curved surface.

The one spacer 42, or one spacer 42a of the two, is constituted by a dielectric (e.g. polyimide). The spacers 42, 42a are placed on the opposite side of the short-circuit conductor 21B across the center of the space G0. When RFID tags 1A, 1B transmit radio waves, a strong electric field is generated between the radiant conductor 21A and the ground conductor 21C on the opposite side (open end side) of the short-circuit conductor 21B. Since the spacer 42, which is a dielectric, is present in this range, the electric field is intensified and antenna gain is improved. The increase in the dielectric constant at the open end side achieves advantageous effect of shortening the wavelength of radio waves. The RFID tags 1A, 1B are made smaller.

Both the top and the bottom of each of the spacers 42, 42a, 42b in FIGS. 3 and 4 may be bonded to the back side of the film wiring board 10. The bonding of the spacers 42, 42a, 42b keeps the folding of the film wiring board 10. In that case, as in the examples shown in FIGS. 3 and 4, one folding region R5 and the third region R3 in Embodiment 1 may be omitted.

Embodiment 2

Figure 5:
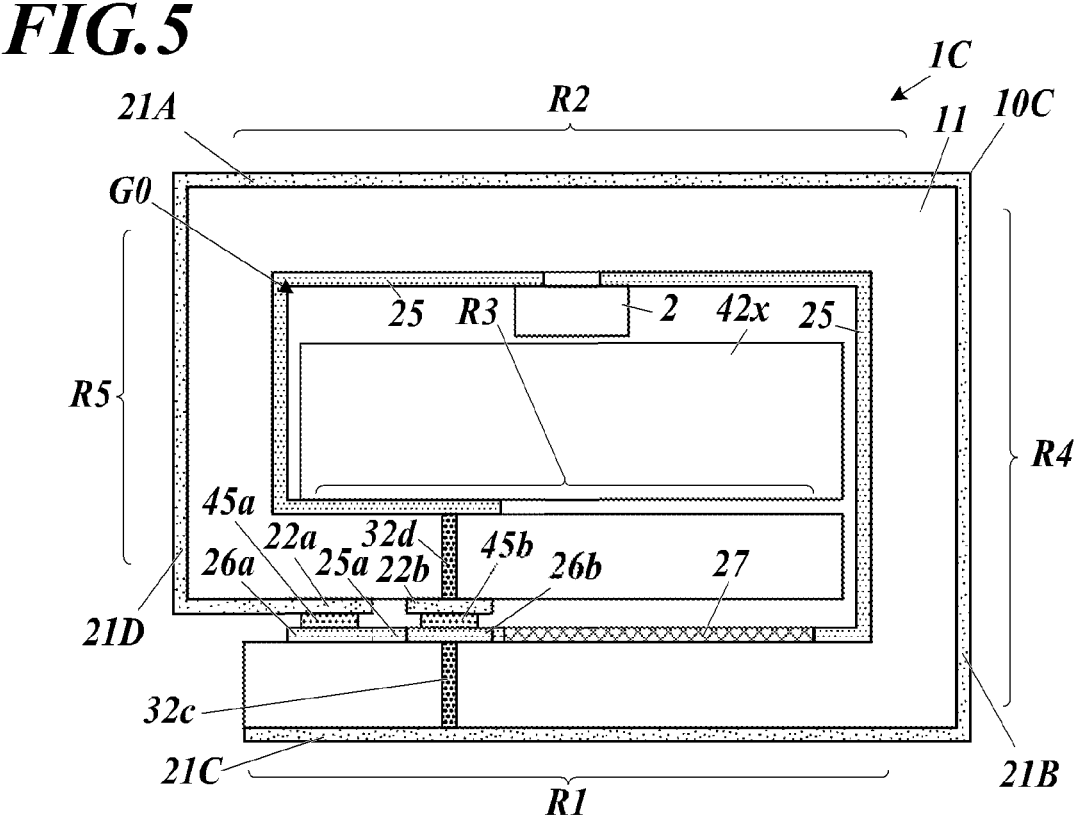
FIG. 5 is a schematic diagram of an RFID tag of Embodiment 2 of the present disclosure.
Figure 6:
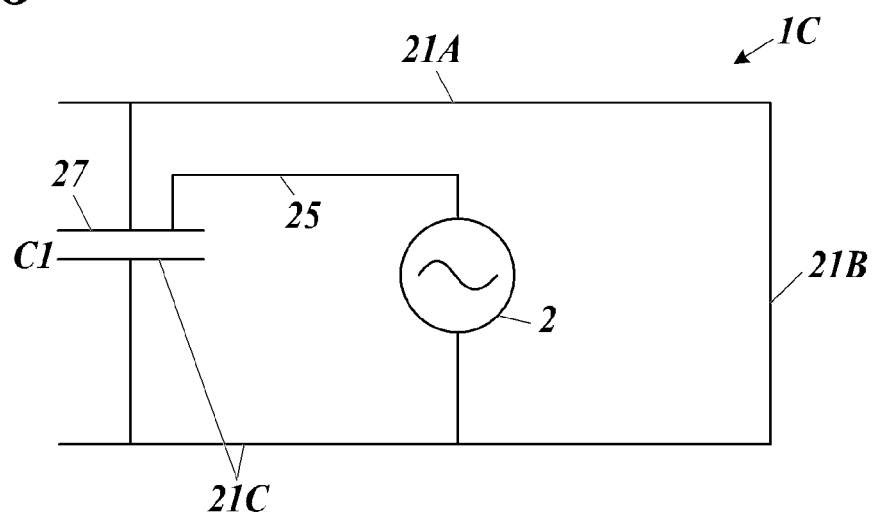
FIG. 6 shows a circuit configuration of the RFID tag of Embodiment 2.
Figure 7:
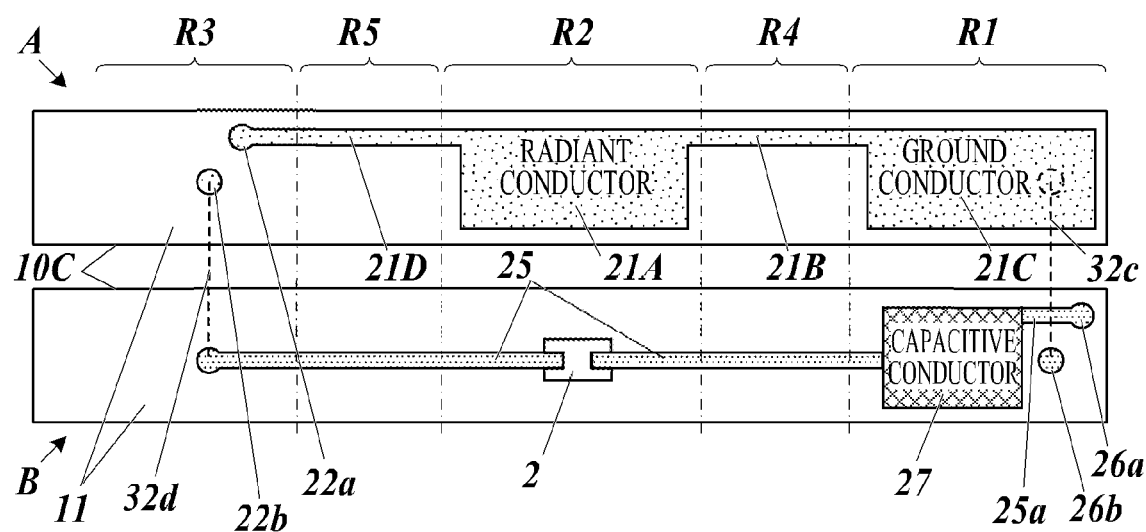
FIG. 7 is an illustration in which a film wiring board of the RFID tag of FIG. 5 is unfolded.

FIG. 5 is a schematic diagram of an RFID tag of Embodiment 2 of the present disclosure. FIG. 6 shows a circuit configuration of the RFID tag of Embodiment 2. FIG. 7 is an illustration in which a film wiring board of the RFID tag of FIG. 5 is unfolded. In the RFID tag 1C of Embodiment 2, the same signs are given to the same elements as those in Embodiment 1. Detailed description is omitted.

As shown in FIG. 7, in the film wiring board 10C of Embodiment 2, the capacitive conductor 27, the wiring conductor 25a, and connection pads 26a, 26b are added on the back side of the first region R1. The capacitive conductor 27 is disposed opposite the ground conductor 21C across the base material 11. The capacitive conductor 27 is wider than the wiring conductor 25 in the width direction of the base material 11, and has a larger area than the short-circuit conductor 21B. The connection pad 26a is located at one end of the wiring conductor 25a. The connection pad 26b is placed behind the ground conductor 21C. The connection pad 26b is connected to the ground conductor 21C via the via conductor 32C. In the third region R3, one end of the wiring conductor 25 is connected to the connection pad 22b on the front side via the via conductor 32d. The other end of the wiring conductor 25 is connected to the capacitive conductor 27 in the first region R1.

A wiring conductor 21D and the connection pads 22a, 22b are added on the front side of the film wiring board 10C. The wiring conductor 21D extends from the radiant conductor 21A to the third region R3 on the opposite side of the short-circuit conductor 21B. The connection pad 22a is located at one end of the wiring conductor 21D. The connection pad 22b is connected to the connection pad 26b on the back side via the via conductor 32d.

The connection pads 22a, 22b on the front side and the connection pads 26a, 26b on the back side are arranged such that the connection pads 22a, 22b overlap the connection pads 26a, 26b respectively when the first region R1 and the third region R3 of the film wiring board 10C are stacked.

In Embodiment 2, the radiant conductor 21A on the front side is an example of the first conductor portion according to the present disclosure. The ground conductor 21C on the front side is an example of the "second conductor portion included in the conductor on the first side" according to the present disclosure. The wiring conductors 25, 25a, the connection pads 26a, 26b, and the capacitive conductor 27 on the back side are an example of the "conductors on the second side other than the second conductor portion" according to the present disclosure.

In the RFID tag 1C of Embodiment 2, the folding region R4 and the folding region R5 are folded. The first region where the ground conductor 21C is disposed and the third region where the connection pads 22a, 22b are disposed are in close proximity and are opposite to each other. The short-circuit conductor 21B is placed in the folding region R4. The wiring conductor 21D is placed in the folding region R5. In a state where the film wiring board 10C is folded, the connection pad 22a on the front side is bonded to the connection pad 26a on the back side via a conductive bonding material 45a. The connection pad 22b on the front side is bonded to the connection pad 26b on the back side via a conductive bonding material 45b. The space G0 higher than the RFID IC 2 may be provided inside the folded portion of the film wiring board 10C. A spacer 42x may be disposed in the space G0. The spacer 42x may be flexible.

According to such a conductor pattern, as shown in FIG. 6, capacitance C1 is configured between the capacitive conductor 27 and the ground conductor 21C. The signal terminal of the RFID IC 2 is connected to the capacitive conductor 27 and the radiant conductor 21A via the wiring conductor 25. Thus, a capacitively loaded plate-shaped inverse F antenna is configured. A small RFID tag 1C having good antenna characteristics is realized.

Flexibility of the RFID tag 1C, which is made by folding the film wiring board 10C, is improved by making the film wiring board 10C thinner. If the film wiring board 10C is thin, the distance between the radiant conductor 21A and the ground conductor 21C is not secured. It decreases the impedance of antenna and makes it difficult to match the output impedance of the RFID IC 2. However, according to the RFID tag 1C of Embodiment 2, the wiring conductor 25 which is connected to the RFID IC 2 is connected to the ground conductor 21C and the capacitance C1 with a high voltage. It increases the impedance of antenna. The output impedance of the RFID IC 2 and the impedance of antenna can be easily matched.

As in the embodiment, the wiring conductor 25 may be connected to the capacitive conductor 27 at a position on the capacitive conductor 27 which is near the short-circuit conductor 21B and be connected to the ground conductor 21C at a position on the ground conductor 21C which is far from the short-circuit conductor 21B. It increases the impedance of antenna.

Modifications 3, 4, and 5

Figure 8:
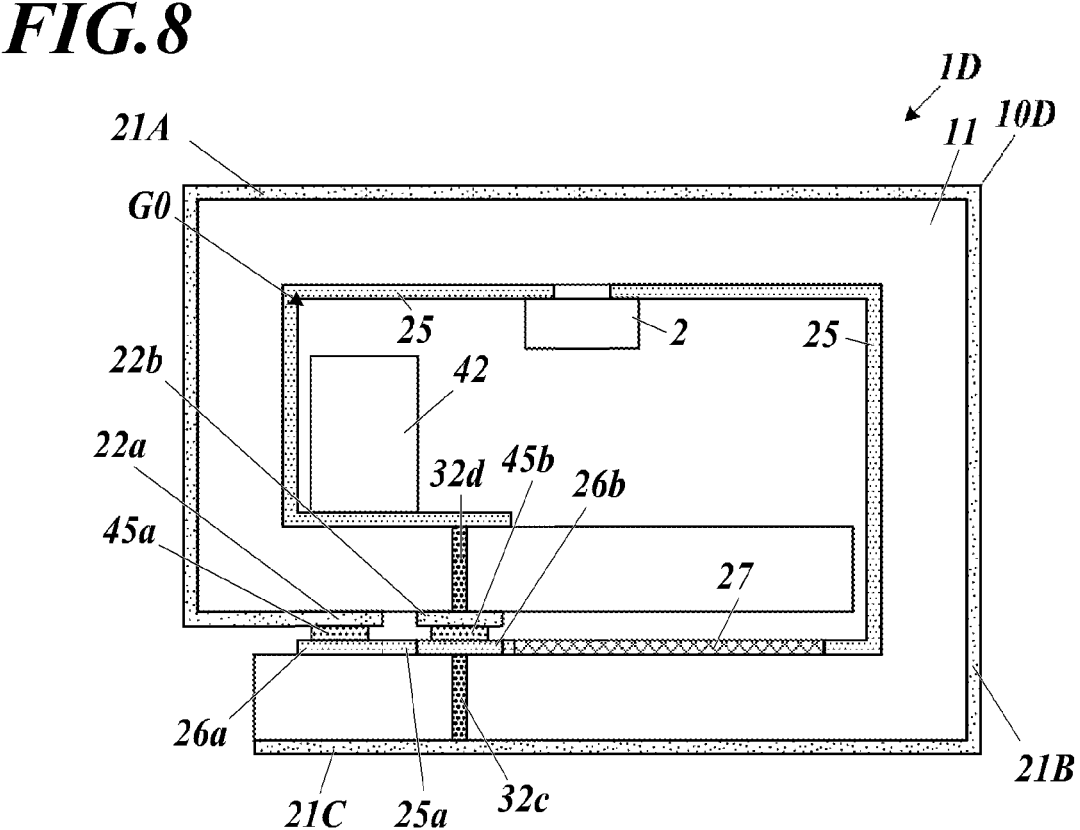
FIG. 8 is a schematic diagram of an RFID tag of Modification 3.
Figure 9:
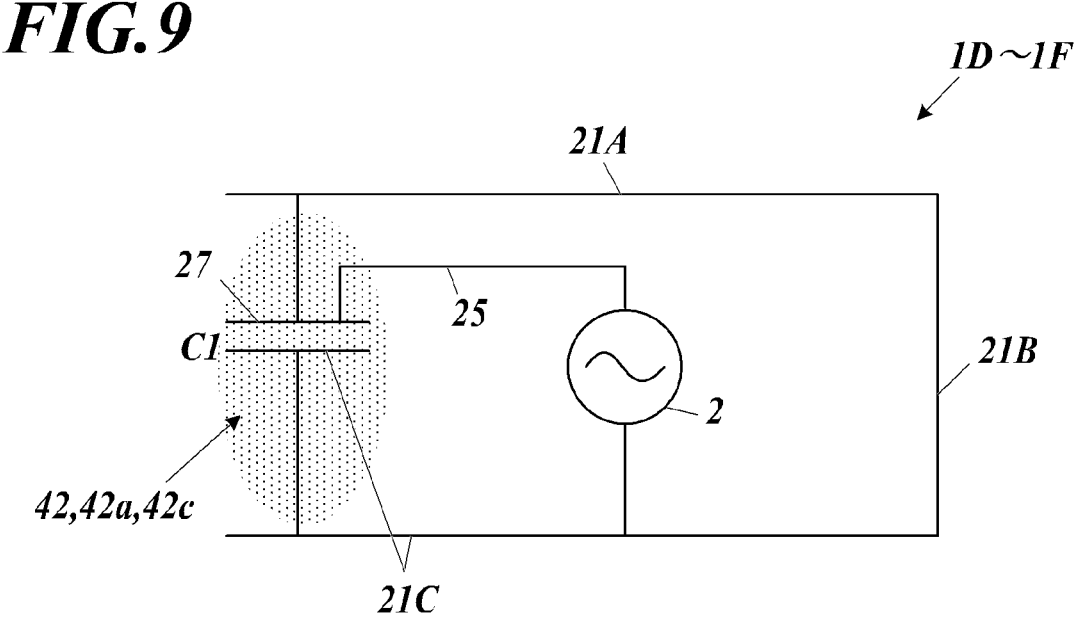
FIG. 9 shows a circuit configuration of the RFID tag of Modification 3.
Figure 10:
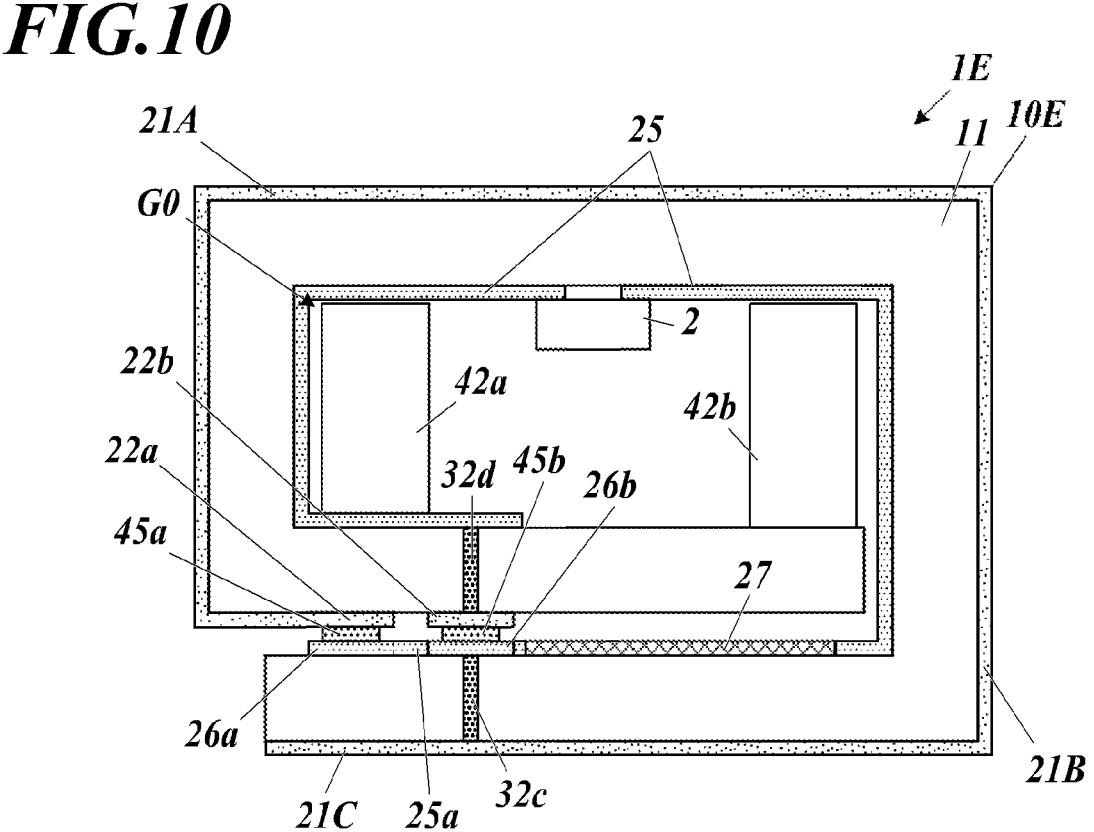
FIG. 10 is a schematic diagram of an RFID tag of Modification 4.
Figure 11:
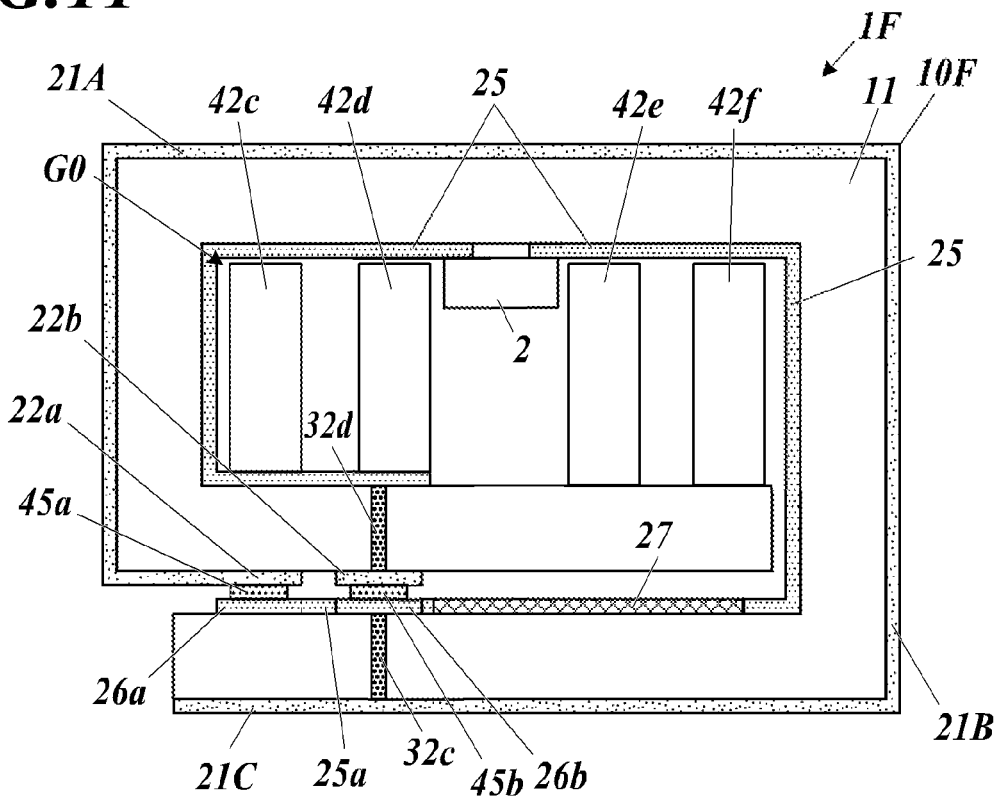
FIG. 11 is a schematic diagram of an RFID tag of Modification 5.

FIG. 8 is a schematic diagram of an RFID tag of Modification 3. FIG. 9 shows a circuit configuration of the RFID tag of Modification 3. FIG. 10 is a schematic diagram of an RFID tag of Modification 4. FIG. 11 is a schematic diagram of an RFID tag of Modification 5.

The RFID tags 1D, 1E, 1F of Modifications 3, 4, and 5 are the same as the RFID tag 1C of Embodiment 2 except for configurations of spacers 42, 42a-42f. The spacers 42, 42a-42f of Modifications 3, 4, and 5 do not fill the entire inner space G0 made by folding the film wiring board 10C. They are arranged to leave a gap in a partial range of the space G0 in the longitudinal direction. The spacers 42a-42d may be flexible.

According to this configuration, in a case where RFID tags 1D-1F are attached to a curved surface having a curvature in the longitudinal direction of the space G0, the RFID tags 1D, 1E, 1F can be flexibly deformed along the curved surface.

Of the spacers 42, 42a-42f, the spacers 42, 42a, 42c disposed farthest away from the short-circuit conductor 21B may be constituted by dielectrics (e.g., polyimide). Other spacers 42b, 42d-42f may also be dielectrics. As shown in FIG. 9, also in a circuit configuration with the capacitance C1, a strong electric field is generated on the opposite side (open end side) of the short-circuit conductor 21B when radio waves are transmitted. Since the spacers 42, 42a, 42c, which are dielectrics, are present in this range, antenna gain is improved. Further, effect of shortening the wireless wavelength makes the antenna smaller.

Both the top and the bottom of each of the spacers 42, 42a-42f in FIGS. 7 and 10-11 may be bonded to the back side of the film wiring board 10C. The bonding of the spacers 42, 42a-42f keeps the folding of the film wiring boards 10D-10F.

Modification 6

Figure 12:
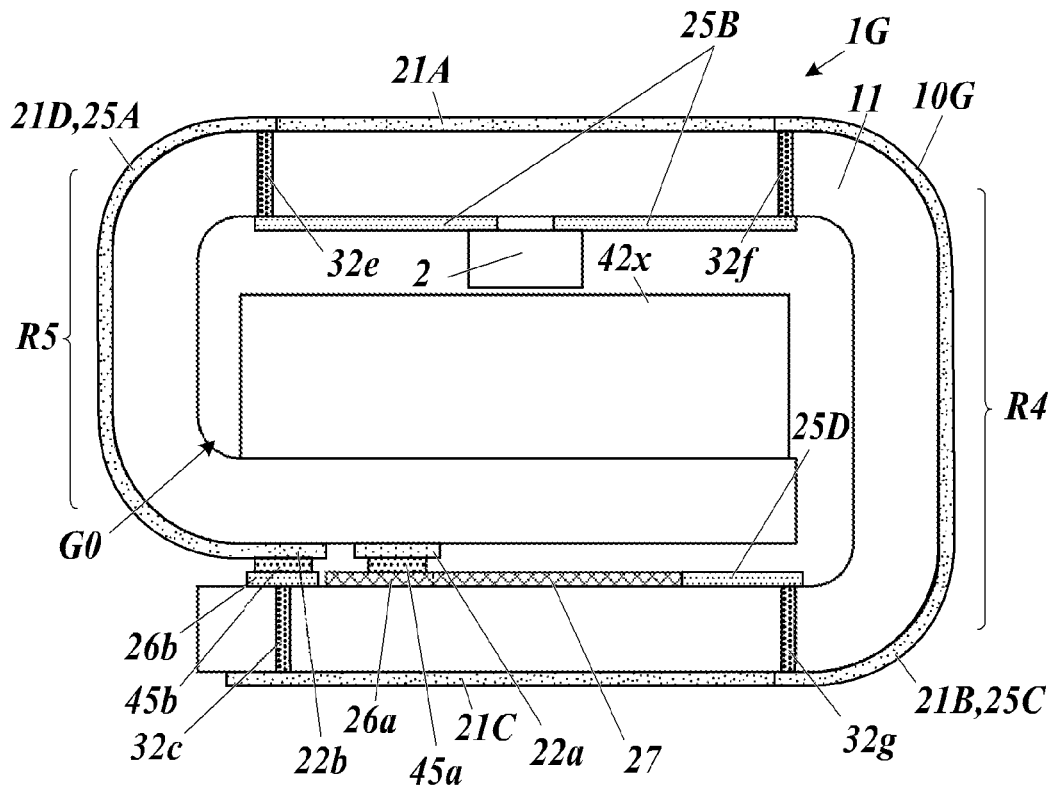
FIG. 12 is a schematic diagram of the RFID tag of Modification 6.
Figure 13:
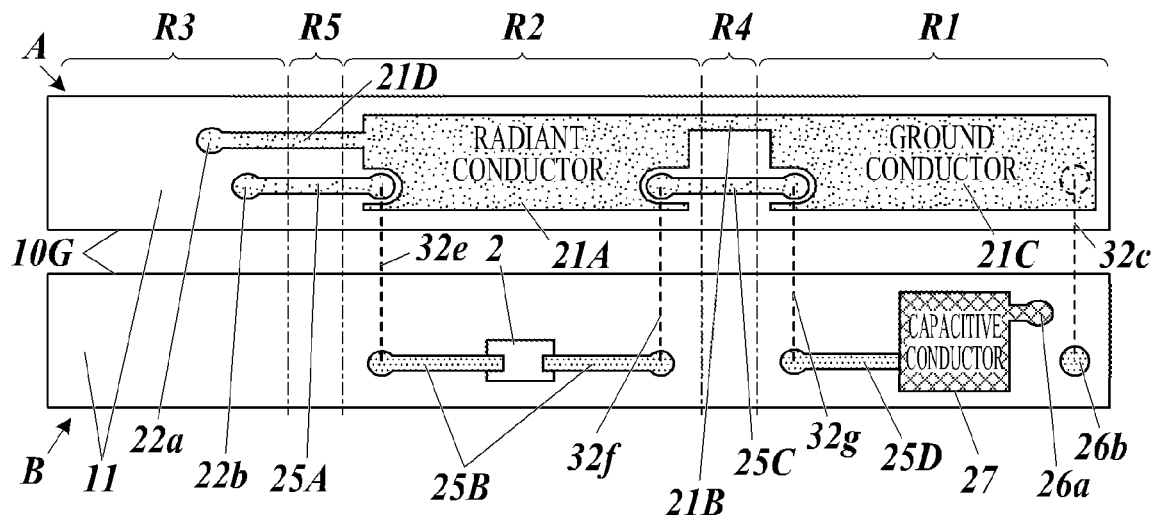
FIG. 13 is an illustration in which a film wiring board of the RFID tag of FIG. 12 is unfolded.

FIG. 12 is a schematic diagram of the RFID tag of Modification 6. FIG. 13 is an illustration in which a film wiring board of the RFID tag of Modification 6 is unfolded. The main difference of the RFID tag 1G of Modification 6 is that the wiring conductor 25 of Embodiment 2 is replaced by wiring conductors 25A-25D of different patterns. Other elements are the same as those of the RFID tag 1C of Embodiment 2. Differences are explained in detail below.

In the film wiring board 10G of the RFID tag 1G of Modification 6, conductors connecting the RFID IC 2 to the capacitive conductor 27 and the ground conductor 21C include the wiring conductors 25A, 25C on the front side, the wiring conductors 25B, 25D on the back side, and via conductors 32c, 32e-32g. The wiring conductor 25A, the via conductor 32e, the wiring conductor 25B, the via conductor 32f, the wiring conductor 25C, the via conductor 32g, and the wiring conductor 25D line up in this order. The wiring conductors 25A, 25C on the front side are placed in the folding regions R4, R5.

In Modification 6, the radiant conductor 21A on the front side is an example of the first conductor portion according to the present disclosure. The ground conductor 21C on the front side is an example of the "second conductor portion included in the conductor on the first side" according to the present disclosure. The wiring conductors 25B, 25D, the connection pads 26a, 26b, and the capacitive conductor 27 on the back side are an example of the "conductors on the second side other than the second conductor portion" according to the present disclosure.

This configuration realizes a configuration without conductors on the backside in the folding regions R4, R5. In the folding regions R4, R5, the configuration having conductors only on one side achieves flexibility of the film wiring board 10G in folding, suppresses deterioration of conductors due to folding, and improves durability of the RFID tag 1G. The longer connection path between the RFID IC 2 and the capacitive conductor 27 increases the impedance of antenna.

Embodiments 3 and 4

Figure 14:
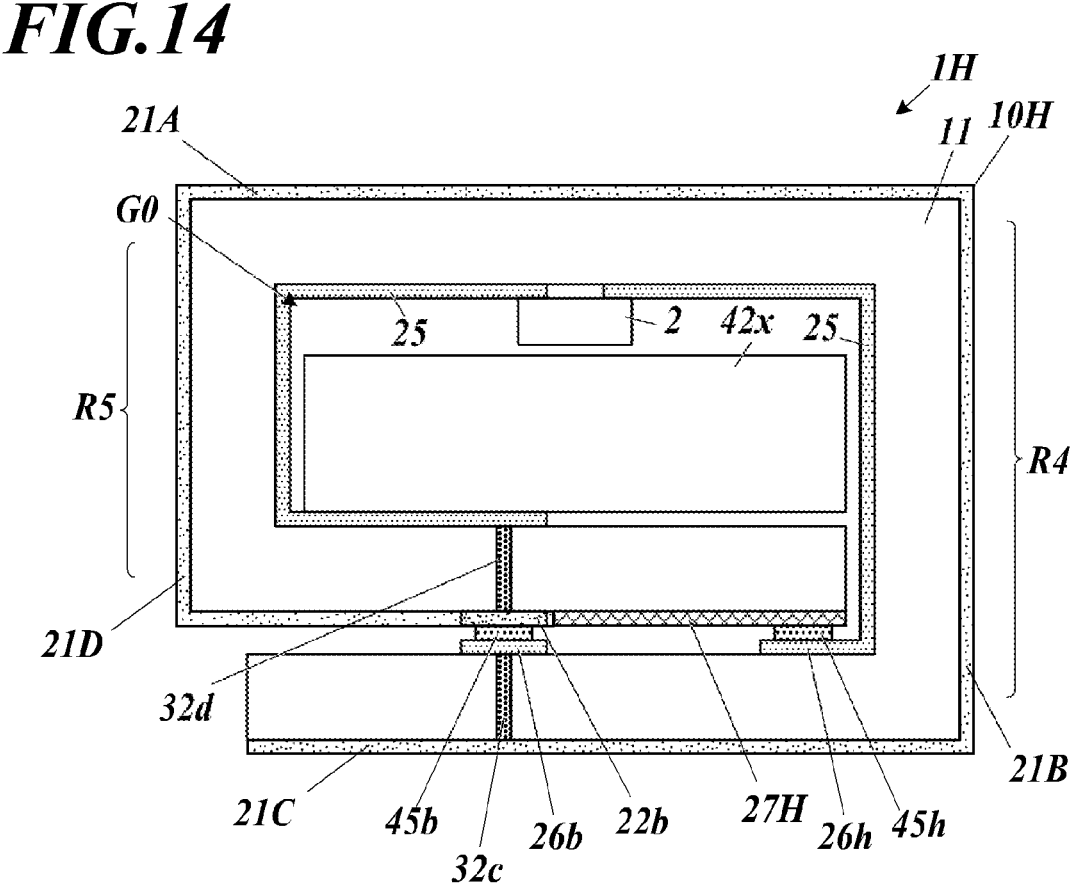
FIG. 14 is a schematic diagram of an RFID tag of Embodiment 3 of the present disclosure.
Figure 15:
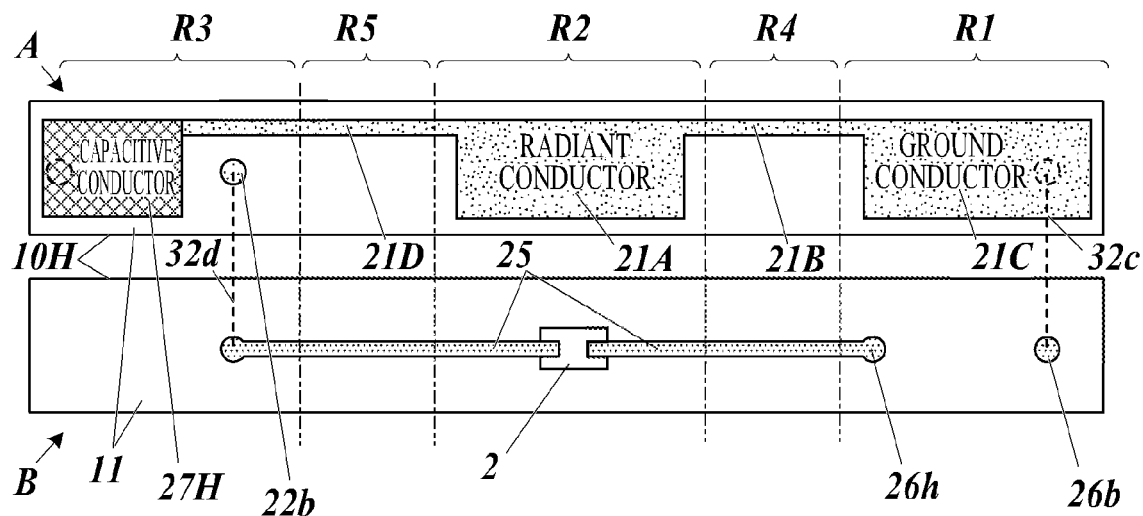
FIG. 15 is an illustration in which a film wiring board of the RFID tag of FIG. 14 is unfolded.
Figure 16:
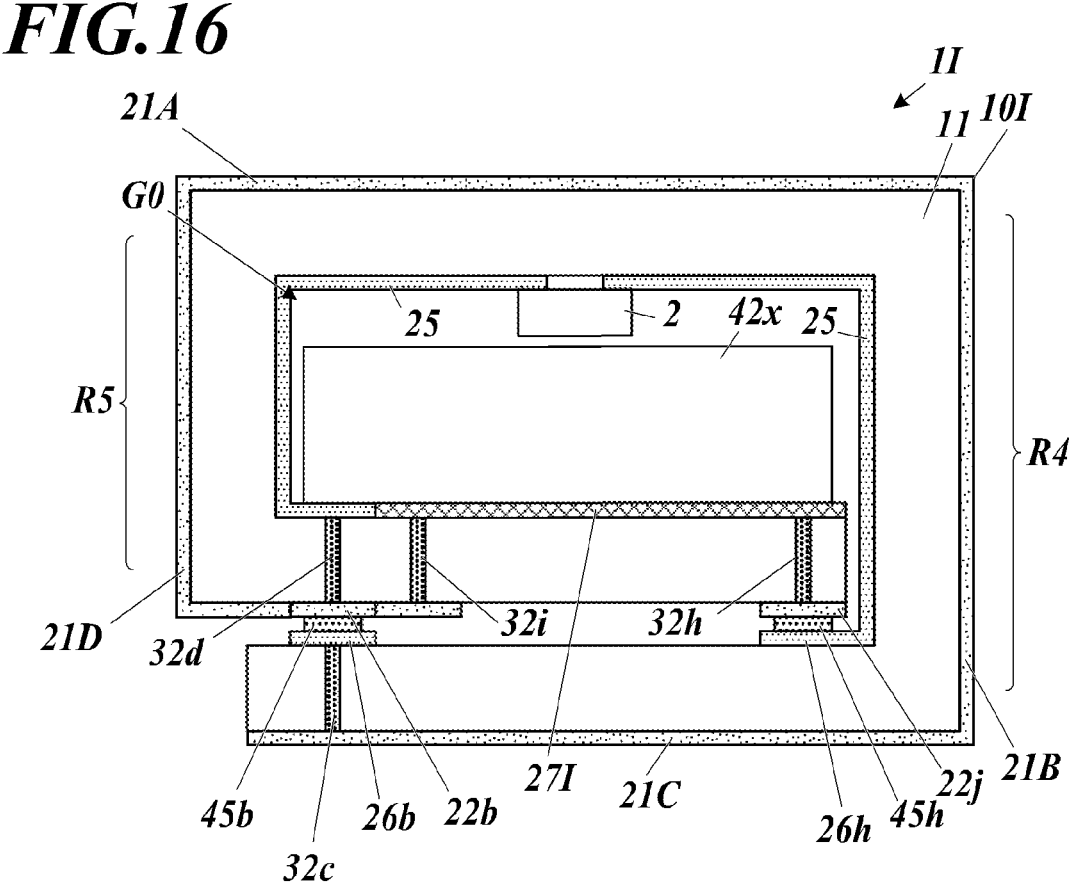
FIG. 16 is a schematic diagram of an RFID tag of Embodiment 4 of the present disclosure.
Figure 17:
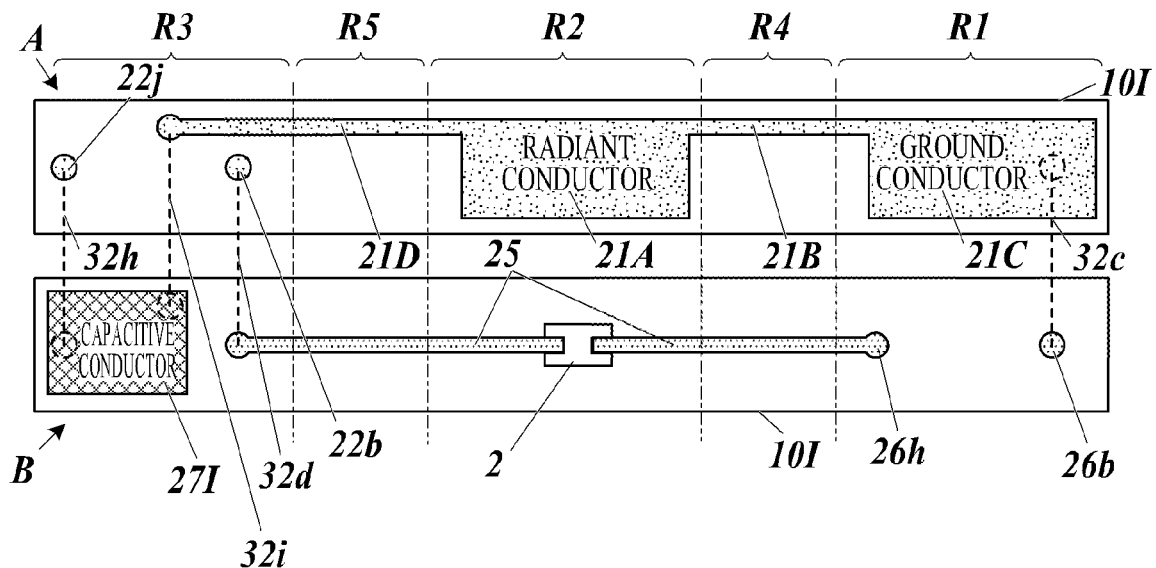
FIG. 17 is an illustration in which a film wiring board of the RFID tag of FIG. 16 is unfolded.

FIG. 14 is a schematic diagram of an RFID tag of Embodiment 3 of the present disclosure. FIG. 15 is an illustration in which a film wiring board of the RFID tag of FIG. 14 is unfolded. FIG. 16 is a schematic diagram of an RFID tag of Embodiment 4 of the present disclosure. FIG. 17 is an illustration in which film wiring of the RFID tag of FIG. 16 is unfolded.

In the RFID tag 1H of Embodiment 3, arrangement and a connection position of a capacitive conductor 27H on the circuit are different from those of the capacitive conductor 27 of Embodiment 2. Other elements are the same as those in Embodiment 2. In the RFID tag 1I of Embodiment 4, arrangement and a connection position of a capacitive conductor 27I in the circuit are different from those of the capacitive conductor 27H of Embodiment 3. Other elements are the same as those in Embodiment 3. Differences are explained in detail below.

As shown in FIG. 15, the capacitive conductor 27H of Embodiment 3 is provided on the front side of the third region R3 of the film wiring board 10H. The capacitive conductor 27H is connected to the radiant conductor 21A via the wiring conductor 21D. The connection pad 22b is provided on the front side of the third region R3 of the film wiring board 10H. One end of the wiring conductor 25 on the back side is connected to the connection pad 22b via the via conductor 32d. A connection pad 26h and the connection pad 26b are provided on the back side of the first region R1 of the film wiring board 10H. The connection pad 26h is connected to one end of the wiring conductor 25. The connection pad 26b is connected to the ground conductor 21C via the via conductor 32c. The connection pad 22b and the capacitive conductor 27H on the front side are arranged such that they overlap the connection pads 26b, 26h on the back side respectively when the film wiring board 10H is folded to stack the first region R1 and the third region R3. The capacitive conductor 27H and the ground conductor 21C are arranged to face each other.

In Embodiment 3, the radiant conductor 21A on the front side is an example of the first conductor portion according to the present disclosure. The ground conductor 21C on the front side is an example of the "second conductor portion included in the conductor on the first side" according to the present disclosure. The wiring conductor 25 on the back side is an example of the "conductor on the second side other than the second conductor portion" according to the present disclosure.

As shown in FIG. 14, in the RFID tag 1H of Embodiment 3, the connection pad 26h on the back side is bonded to a part of the capacitive conductor 27H via a conductive bonding material 45h in a state where the film wiring board 10H is folded. The connection pad 26b on the back side is bonded to the connection pad 22b on the front side via the conductive bonding material 45b. One end of a wiring conductor extending from the capacitive conductor 27H may be bonded to the connection pad 26h on the backside.

In such a configuration, capacitance is configured between the capacitive conductor 27H and the ground conductor 21C. A part of the capacitive conductor 27H is connected to the radiant conductor 21A via the wiring conductor 21D.

Another part of the capacitive conductor 27H is connected to the signal terminal of the RFID IC 2 via the wiring conductor 25. Such a configuration realizes a capacitively loaded plate-shaped inverse F antenna as in Embodiment 2.

As shown in FIG. 17, the capacitive conductor 27I of Embodiment 4 is provided on the back side of the third region R3 of the film wiring board 10I. A connection pad 22*j* is provided on the front side of the third region R3 of the film wiring board 10I. The connection pad 22*j* is connected to the capacitive conductor 27I via a via conductor 32*h*. A part of the capacitive conductor 27I is connected to one end of the wiring conductor 21D on the front side via the via conductor 32*i*.

As shown in FIG. 16, in the RFID tag 1I of Embodiment 4, the connection pads 22*b*, 22*j* on the front side are connected to the connection pads 26*b*, 26*h* on the back side via the conductive bonding materials 45*b*, 45*h* in a state where the film wiring board 10I is folded. The capacitive conductor 27I and the ground conductor 21C are opposite each other.

In Embodiment 4, the radiant conductor 21A on the front side is an example of a first conductor portion according to the present disclosure. The ground conductor 21C on the front side is an example of the "second conductor portion included in the conductor on the first side" according to the present disclosure. The wiring conductor 25 and the capacitive conductor 27I on the back side are an example of the "conductors on the second side other than the second conductor portion" according to the present disclosure.

In such a configuration, capacitance is configured between the capacitive conductor 27I and the ground conductor 21C. A part of the capacitive conductor 27I is connected to the radiant conductor 21A via the via conductor 32*i* and the wiring conductor 21D. Another part of the capacitive conductor 27I is connected to the wiring conductor 25 via the via conductor 32*h*. Such a configuration realizes a capacitively loaded plate-shaped inverse F antenna as in Embodiment 2.

Modification 7

Figure 18:
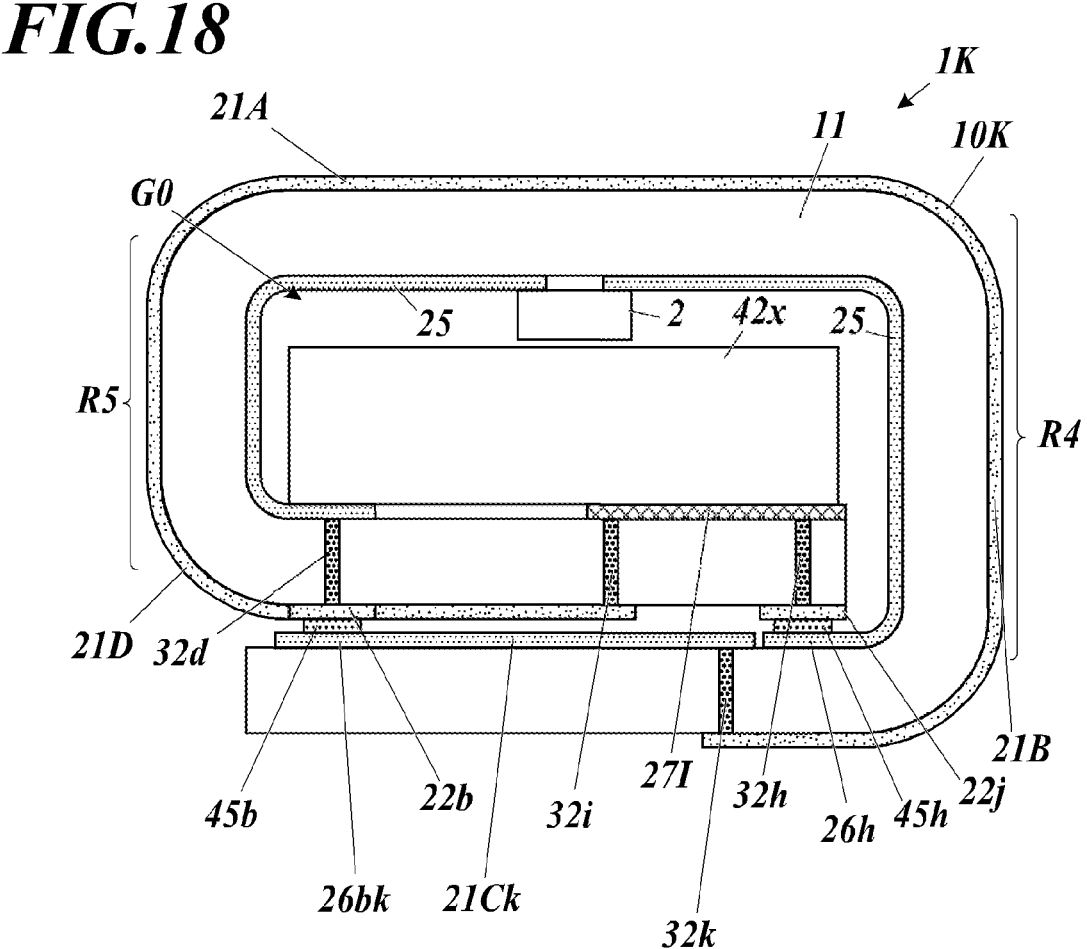
FIG. 18 is a schematic diagram of an RFID tag of Modification 7.
Figure 19:
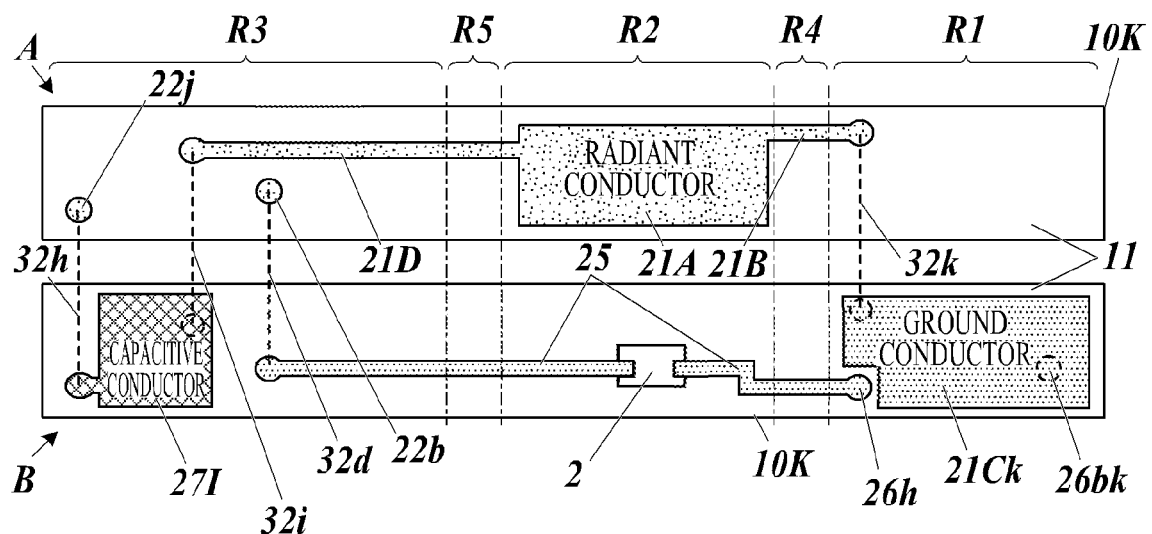
FIG. 19 is an illustration in which a film wiring board of the RFID tag of FIG. 18 is unfolded.

FIG. 18 is a schematic diagram of an RFID tag of Modification 7. FIG. 19 is an illustration in which a film wiring board of the RFID tag of FIG. 18 is unfolded. The RFID tag 1K of Modification 7 differs from Embodiment 4 mainly in that a ground conductor 21Ck is provided on the back side of the first region R1. Other elements are the same as those in Embodiment 4. Differences are explained in detail below.

The ground conductor 21Ck of Modification 7 is connected to the short-circuit conductor 21B via a via conductor 32*k*.

Connection between the ground conductor 21Ck and the wiring conductor 25 on the front side is achieved by:
  joint between a part 26*bk* of the ground conductor 21Ck and the connection pad 22*b* on the front side via the conductive bonding material 45*b*; and
  connection between the connection pad 22*b* and one end of the wiring conductor 25 via the via conductor 32*d*.

In Modification 7, the radiant conductor 21A on the front side is an example of the first conductor portion according to the present disclosure. The ground conductor 21Ck on the back side is an example of the "second conductor portion included in the conductor on the second side" according to the present disclosure. The wiring conductor 25, the connection pad 26*h*, and the capacitive conductor 27I on the back side are an example the "conductors on the second side other than the second conductor portion" according to the present disclosure.

Such a configuration also configures a plate-shaped inverted F antenna in which the ground conductor 21Ck and the radiant conductor 21A are arranged opposite to each other and are short-circuited by the short-circuit conductor 21B. The capacitive conductor 27I is disposed opposite to the ground conductor 21Ck to form capacitance. It realizes a capacitively loaded plate-shaped inverse F antenna.

Embodiment 5

Figure 20:
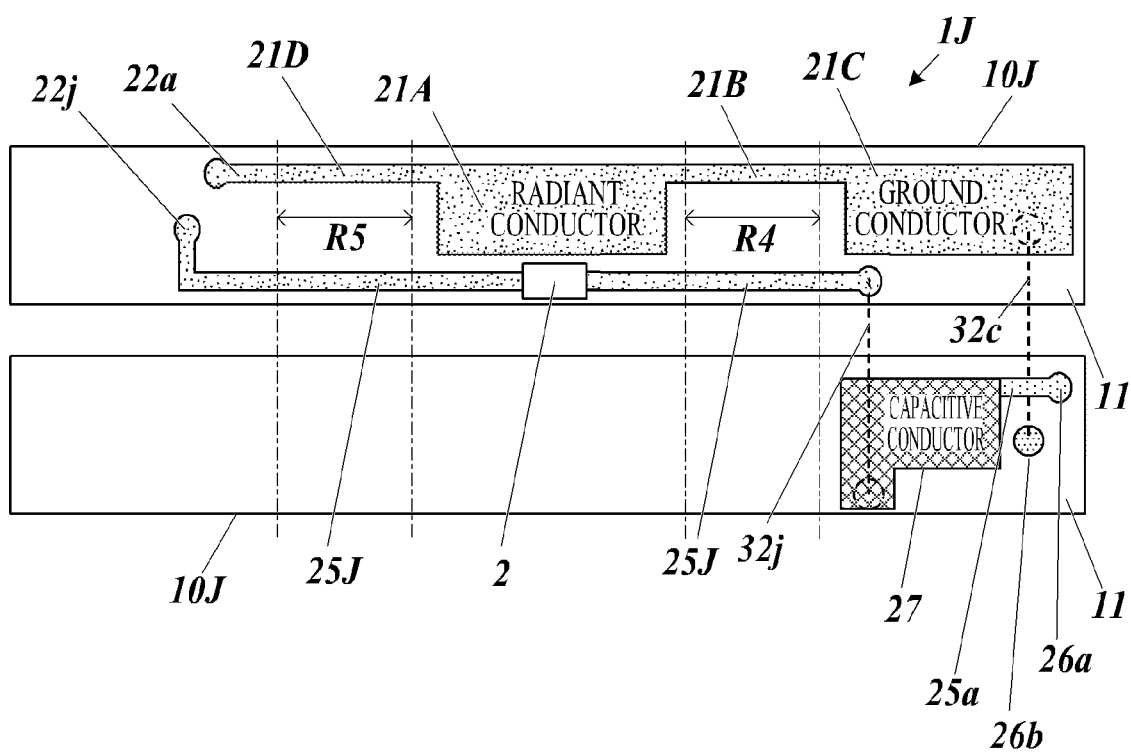
FIG. 20 is an illustration in which a film wiring board of an RFID tag of Embodiment 5 of the present disclosure is unfolded.

FIG. 20 is an illustration in which a film wiring board of an RFID tag of Embodiment 5 of the present disclosure is unfolded. In the RFID tag 1J of embodiment 5, the wiring conductor 25 in Embodiment 2 is replaced by a wiring conductor 25J provided on the front side of the film wiring board 10J. On the front side of the film wiring board 10J, the wiring conductor 25J is provided at a position away from the radiant conductor 21A, the short-circuit conductor 21B, the ground conductor 21C, and the wiring conductor 21D in the width direction of the base material 11. One end of the wiring conductor 25J is connected to the connection pad 22*j*. The other end of the wiring conductor 25J is connected to the capacitive conductor 27 via the via conductor 32*j*. The capacitive conductor 27, the connection pads 26*a*, 26*b*, and the wiring conductor 25*a* connecting the capacitive conductor 27 and the connection pad 26*a* are provided at positions which are on the back side of the film wiring board 10J and which are behind the ground conductor 21C. The RFID IC 2 in the wiring conductor 25J is provided on the front side of the film wiring board 10J. The RFID IC 2 is mounted on the front side of the film wiring board 10J.

In Embodiment 5, the radiant conductor 21A on the front side is an example of the first conductor portion according to the present disclosure. The ground conductor 21C on the front side is an example of the "second conductor portion included in the conductor on the first side" according to the present disclosure. The wiring conductor 25*a*, the connection pads 26*a*, 26*b*, and the capacitive conductor 27 on the back side are an example of the "conductors of the second side other than the second conductor portion" according to the present disclosure.

In the RFID tag 1J of Embodiment 5, the RFID IC 2 faces outward and is located on the outer side in a state where the film wiring board 10J is folded. Therefore, the RFID IC 2 can be easily replaced.

In the RFID tag 1J of Embodiment 5, no conductor is provided on the backside of the folding regions R4, R5 of the film wiring board 10J. It improves flexibility of the film wiring board 10J when it is folded.

In the RFID tag 1J of Embodiment 5, the wiring conductor 25J and the RFID IC 2 are provided on the front side of the film wiring board 10J and are aligned with the radiant conductor 21A in the width direction of the base material 11. In contrast, in the RFID tag 1C of Embodiment 2, the wiring conductor 25J and the RFID IC 2 are provided on the back side of the film wiring board 10J and overlap with the radiant conductor 21A and the ground conductor 21C. Thus, the RFID IC 2 is placed at a position where it overlaps with the radiating conductor 21A and the ground conductor 21C. It makes the base material 11 shorter in the width direction. It is advantageous in terms of miniaturization. The RFID IC 2 is placed at the center of the base material 11 in the width direction. It improves protection of the RFID IC 2 and durability of the RFID tag 1.

Antenna Characteristics

Figure 21:
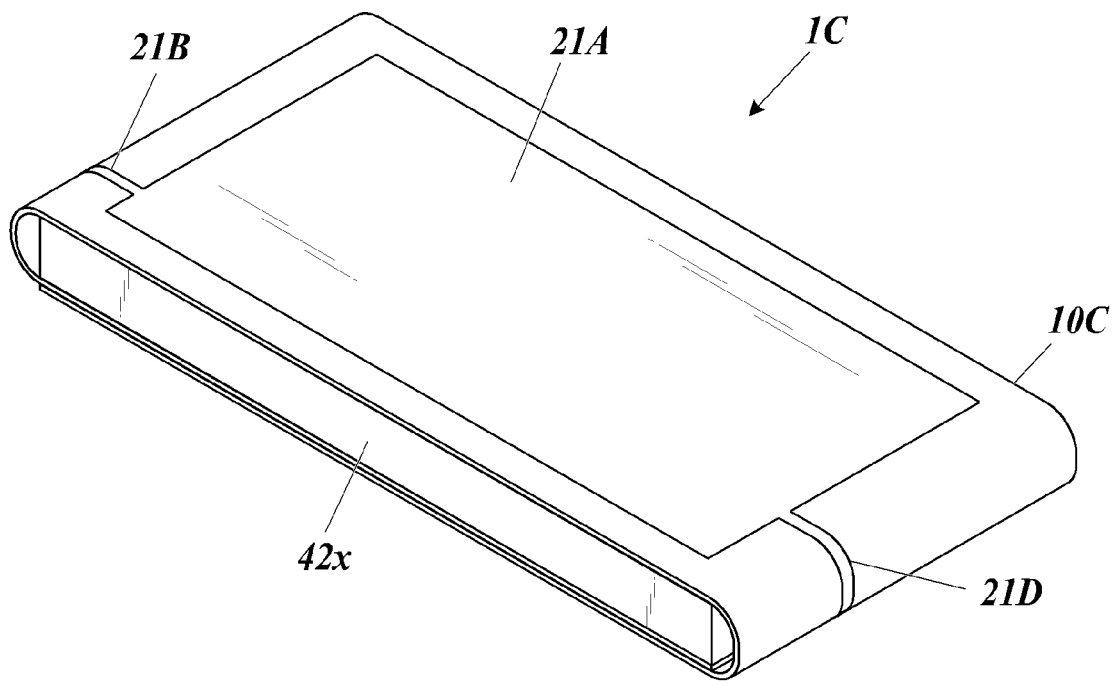
FIG. 21 is a perspective view of the RFID tag of Embodiment 2 used in simulation.
Figure 22:
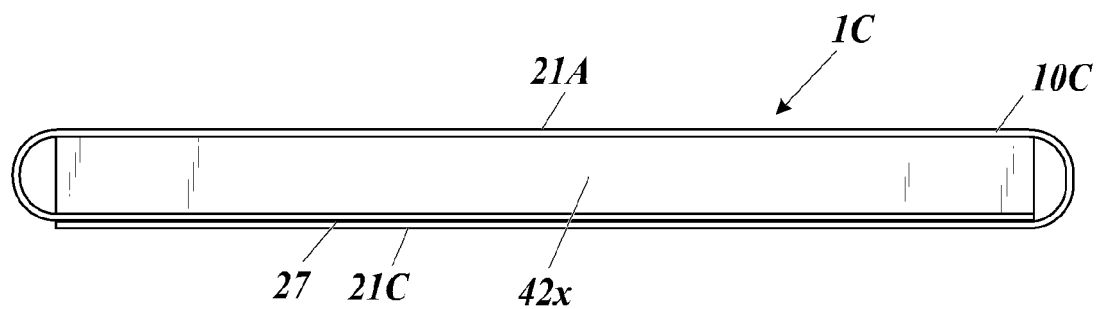
FIG. 22 is a side view of the RFID tag of FIG. 21.
Figure 23:
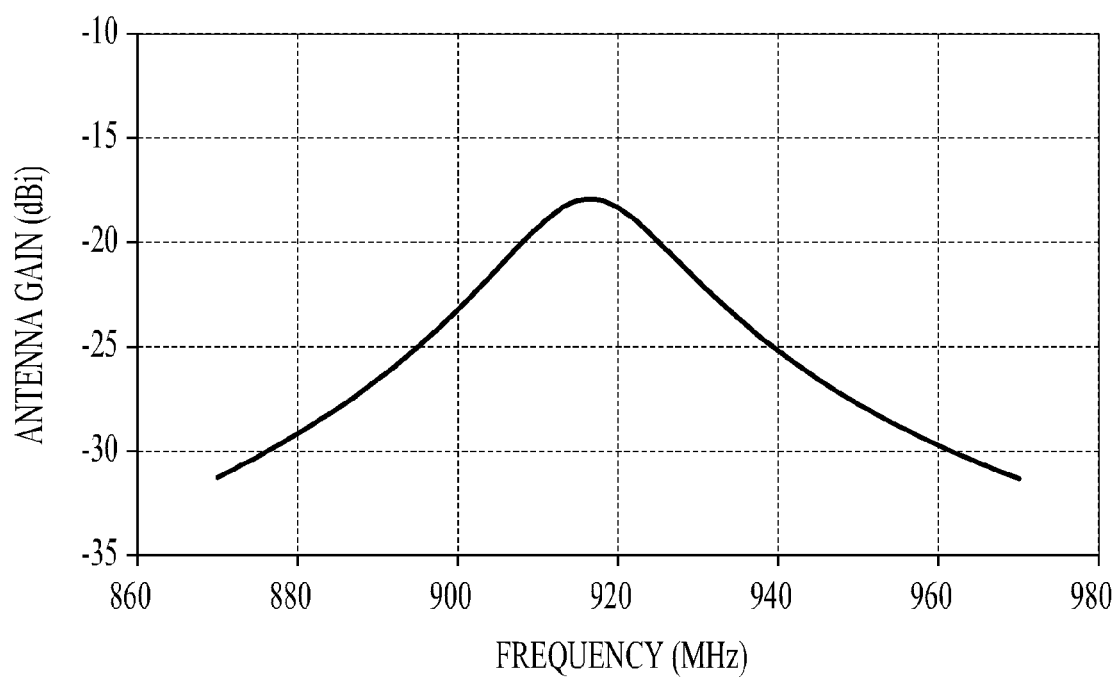
FIG. 23 is a graph showing frequency characteristics of antenna gain of the RFID tag of FIG. 21.

FIG. 21 is a perspective view of the RFID tag of Embodiment 2 used in simulation. FIG. 22 is a side view of the RFID tag of FIG. 21. FIG. 23 is a graph showing frequency characteristics of antenna gain of the RFID tag of FIG. 21 and FIG. 22.

Simulation of antenna gain in the Z direction was performed in a configuration of the RFID tag 1C of Embodiment 2. The size of the RFID tag was 5 mm in the X direction, 10 mm in the Y direction, and 1 mm in the Z direction. Polyimide was used as the spacer 42x. The X direction is the width direction of the base material 11. The Y direction is the longitudinal direction of the base material 11. The Z direction is the direction in which the radiant conductor 21A and the ground conductor 21C overlap, and is the vertical direction of the radiant conductor 21A. As a result, as shown in FIG. 23, frequency characteristics of antenna are easily matched to the transmission frequency band (920 MHz band) of the RFID IC 2. As shown in FIG. 23, antenna gain of more than −20 dBi was obtained.

As described above, the RFID tags 1, 1A-1J of the embodiment include the flexible film wiring boards 10, 10C, 10H-10J. The RFID IC 2 is mounted on the film wiring boards 10, 10C, 10H-10J. The film wiring boards 10, 10C, 10H-10J are folded so that the radiant conductor 21A and the ground conductor 21C on the front side and conductors on the back side (such as the wiring conductor 25 and the capacitive conductor 27) overlap in the direction perpendicular to the plane of the radiant conductor 21A. They constitute an antenna in which three or more layers of conductors are layered. Small RFID tags 1, 1A-1J with improved antenna characteristics are realized.

Embodiments of the present invention are described above. The RFID tags of the present disclosure are not limited to the above embodiments. For example, the above embodiments show configurations in which the film wiring board is folded so that the first region and the second region overlap or the first region to the third region overlap. Alternatively, a configuration in which the film wiring board is folded so that more regions overlap may be employed. The details specifically indicated in the embodiments, such as the material of the base material of the film wiring board and the material of the spacer, may be changed as appropriate within the scope of the claims of the invention.

INDUSTRIAL APPLICABILITY

The present disclosure can be utilized in RFID tags.

REFERENCE SIGNS LIST

1, 1A-1K RFID tag
2 RFID IC
10, 10C, 10H-10K film wiring board
11 base material
21A radiant conductor (first conductor portion)
21B short-circuit conductor
21C, 21Ck ground conductor (second conductor portion)
21D wiring conductor
25, 25a, 25A-25D, 25J wiring conductor
22a, 22b, 22j, 26a, 26b, 26h connection pad
27, 27H, 27I capacitive conductor
32a-32k via conductor
41 bonding material
42, 42a-42f, 42x spacer
45a, 45b, 45h conductive bonding material
G0 space
R4, R5 folding region

The invention claimed is:

1. An RFID tag, comprising:
   a film wiring board that comprises:
      a base material which is flexible and which includes a first side and a second side opposite the first side; and
      conductors located on the first side and the second side; and
   an RFID IC connected to the conductors,
   wherein the film wiring board is folded so that at least a first conductor portion included in a conductor on the first side, a second conductor portion included in a conductor on the first side or the second side, and a conductor on the second side other than the second conductor portion overlap.

2. The RFID tag according to claim 1, wherein
   the conductor on the first side or the conductor on the second side comprises a capacitive conductor, and
   the capacitive conductor faces the second conductor portion in a state where the film wiring board is folded.

3. The RFID tag according to claim 2, wherein
   the RFID IC is connected to the conductor on the second side, and
   the first side faces outward in a state where the film wiring board is folded.

4. The RFID tag according to claim 3, wherein
   a spacer is placed in a space between overlapping portions of the film circuit board, and
   in a part of the space in a longitudinal direction, the RFID tag has a gap where the spacer is not present.

5. The RFID tag according to claim 4, wherein
   the conductor on the first side includes a short-circuit conductor that short-circuits the first conductor portion and the second conductor portion, and
   the spacer is a dielectric and is located on an opposite side of the short-circuit conductor across a center of the space.

6. The RFID tag according to claim 4, wherein the base material is located between the first conductor portion and the second conductor portion.

7. The RFID tag according to claim 3, wherein the base material is located between the first conductor portion and the second conductor portion.

8. The RFID tag according to claim 2, wherein
   a spacer is placed in a space between overlapping portions of the film circuit board, and
   in a part of the space in a longitudinal direction, the RFID tag has a gap where the spacer is not present.

9. The RFID tag according to claim 8, wherein
   the conductor on the first side includes a short-circuit conductor that short-circuits the first conductor portion and the second conductor portion, and
   the spacer is a dielectric and is located on an opposite side of the short-circuit conductor across a center of the space.

10. The RFID tag according to claim 8, wherein the base material is located between the first conductor portion and the second conductor portion.

11. The RFID tag according to claim 2, wherein the base material is located between the first conductor portion and the second conductor portion.

12. The RFID tag according to claim 1, wherein
    the RFID IC is connected to the conductor on the second side, and the first side faces outward in a state where the film wiring board is folded.

13. The RFID tag according to claim 12, wherein
a spacer is placed in a space between overlapping portions of the film circuit board, and
in a part of the space in a longitudinal direction, the RFID tag has a gap where the spacer is not present.

14. The RFID tag according to claim 13, wherein
the conductor on the first side includes a short-circuit conductor that short-circuits the first conductor portion and the second conductor portion, and
the spacer is a dielectric and is located on an opposite side of the short-circuit conductor across a center of the space.

15. The RFID tag according to claim 13, wherein the base material is located between the first conductor portion and the second conductor portion.

16. The RFID tag according to claim 12, wherein the base material is located between the first conductor portion and the second conductor portion.

17. The RFID tag according to claim 1, wherein
a spacer is placed in a space between overlapping portions of the film circuit board, and
in a part of the space in a longitudinal direction, the RFID tag has a gap where the spacer is not present.

18. The RFID tag according to claim 17, wherein
the conductor on the first side includes a short-circuit conductor that short-circuits the first conductor portion and the second conductor portion, and
the spacer is a dielectric and is located on an opposite side of the short-circuit conductor across a center of the space.

19. The RFID tag according to claim 17, wherein the base material is located between the first conductor portion and the second conductor portion.

20. The RFID tag according to claim 1, wherein the base material is located between the first conductor portion and the second conductor portion.

\* \* \* \* \*